United States Patent
Pfaff et al.

(10) Patent No.: US 12,021,473 B2
(45) Date of Patent: Jun. 25, 2024

(54) CONTROL FOR AN ELECTROMAGNETIC HOLDING BRAKE

(71) Applicant: ebm-papst St. Georgen GmbH & Co. KG, St. Georgen (DE)

(72) Inventors: Andreas Pfaff, Schoenwald (DE); Paul Layes, Villingen-Schwenningen (DE); Tobias Maier, Rottweil (DE); Sebastian Flihs, Hüfingen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 17/365,446

(22) Filed: Jul. 1, 2021

(65) Prior Publication Data
US 2022/0006401 A1    Jan. 6, 2022

(30) Foreign Application Priority Data
Jul. 1, 2020    (DE) .......................... 102020117349.0

(51) Int. Cl.
| | |
|---|---|
| H02P 21/36 | (2016.01) |
| H02M 3/04 | (2006.01) |
| H02P 3/06 | (2006.01) |
| H02P 3/18 | (2006.01) |

(52) U.S. Cl.
CPC ................ *H02P 3/06* (2013.01); *H02M 3/04* (2013.01)

(58) Field of Classification Search
CPC .............. H02P 5/74; H02P 3/12; H02P 27/04
See application file for complete search history.

(56) References Cited

U.S. PATENT DOCUMENTS

| | | | |
|---|---|---|---|
| 2008/0202859 A1* | 8/2008 | Tegtmeier | ............... B66B 5/027 187/288 |
| 2018/0134519 A1* | 5/2018 | Kattainen | ............... B66B 5/027 |
| 2022/0081253 A1* | 3/2022 | Lindegger | ................. B66B 1/32 |

FOREIGN PATENT DOCUMENTS

| | | |
|---|---|---|
| DE | 10057778 A1 | 10/2001 |
| DE | 202012101654 U1 | 7/2012 |
| DE | 102016121327 A1 | 5/2018 |
| JP | 01082503 A | 3/1989 |
| JP | 11144954 A | 5/1999 |
| JP | 2009233761 A | 10/2009 |

OTHER PUBLICATIONS

German Search Report dated Mar. 10, 2020.

* cited by examiner

*Primary Examiner* — Kawing Chan
*Assistant Examiner* — Charles S Laughlin
(74) *Attorney, Agent, or Firm* — Dickinson Wright PLLC

(57) ABSTRACT

A control for an electromagnetic holding brake with a coil for releasing the holding brake and maintaining it in the released position, which requires a minimum brake coil voltage to maintain it in the re-leased position, having a DC-DC converter with an input and an output, the DC-DC converter being designed to convert a variable input voltage pre-sent at the input into a predetermined switch-on voltage provided at the output and a predetermined holding voltage provided at the output, the holding voltage corresponding to the minimum brake coil voltage, the DC-DC converter being designed to implement a 2-stage voltage control and, in a first stage, to maintain the switch-on voltage as a regulated DC voltage for a predetermined time, to downregulate the voltage from the switch-on voltage following a predetermined voltage curve to the holding voltage as regulated DC voltage, and to maintain it in a second stage.

21 Claims, 1 Drawing Sheet

CONTROL FOR AN ELECTROMAGNETIC HOLDING BRAKE

RELATED APPLICATIONS

Figure 1:
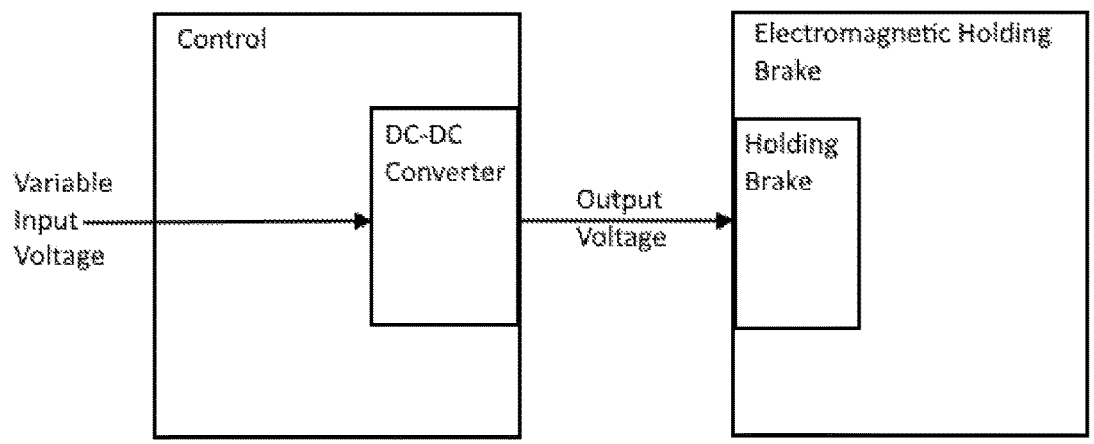

This application claims priority to German Patent Application No. 10 2020 117 349.0, filed Jul. 1, 2020 the entire contents of which are incorporated herein by reference in their entirety.

FIELD

The invention relates to a control for an electromagnetic holding brake, an engine with an electromagnetic holding brake controlled by such a control, and a method for controlling an electromagnetic holding brake with such a control.

BACKGROUND

A multitude of safety brakes with a respective control are known from the prior art. Safety brakes generally have the task of decelerating moving masses or loads while they are moving or keeping them securely at a standstill. The braking torque or the braking force is usually generated by preloaded springs. In the prior art, safety brakes are often used as holding brakes, which as a rule are not designed to decelerate movement, but only to hold the mass at a standstill. Usually, a regulated drive handles the braking of movement, whereas the safety or holding brakes are often designed for emergency braking.

During normal operation, a holding brake therefore only has to hold the mass or load—e.g., a system or an engine with which it is associated—securely at a standstill.

In part, the brakes are released or opened electromagnetically. In the de-energized state, the brakes are closed or, rather, the brakes are applied so that they comply with the required safety aspects in all operating conditions, including emergency stop and power failure.

In particular, electromagnetic holding brakes usually have a coil through which current flows during released operation, which coil pulls a metallic armature plate against the force of a spring that applies pressure to the armature plate. In order to ensure both the release of the brake itself and the maintaining of the brake in the released position, a provision is usually made in the prior art to supply the coil with a voltage and a current corresponding at least to the value for releasing the brake, usually substantially higher, in order to ensure reliable release and holding in the released position.

In the case of compact drives in which electronic assemblies such as gears, brakes, encoders, and power electronics are integrated or combined into one assembly, unnecessarily high operating voltages of the brake result in unnecessarily high power consumption by the brake itself on the one hand and, on the other, to increased heat generation in the drive and thus to a loss of performance.

BRIEF DECSCRIPTION OF THE DRAWINGS

Figure 2:
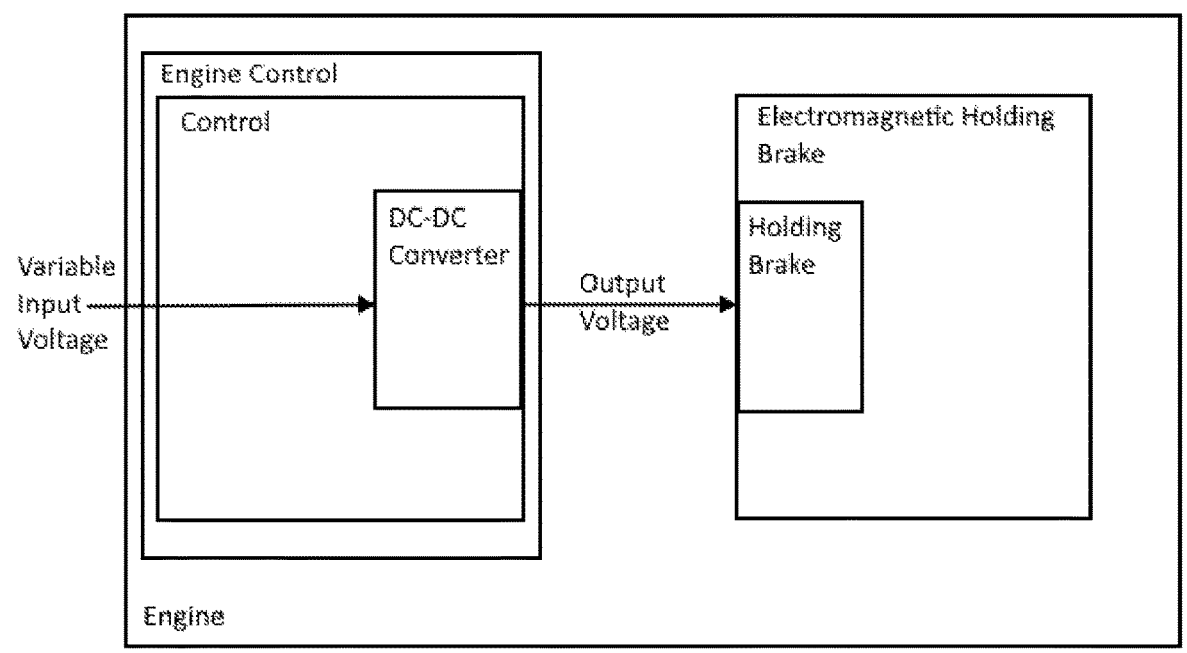

The accompanying drawings incorporated in and forming a part of the specification illustrate several aspects of the present invention, and together with the description serve to explain the principles of the invention. In the drawings:

FIG. 1 is a system view of an embodiment of a control for an electromagnetic holding brake constructed in accordance with the teachings of the present invention; and FIG. 2 is a system view of an embodiment of an engine having an engine control incorporating the control for an electromagnetic holding brake of FIG. 1.

DETAILED DESCRIPTION

It is therefore an object of the disclosure to overcome the aforementioned drawbacks and to provide a control for an electromagnetic holding brake, an electromagnetic holding brake itself, and a method for controlling the electromagnetic holding brake by means of which low consumption of the holding brake and a high EMC is achieved and the lowest possible amount of heat generation is attained.

This object is achieved by the combination of features according to claim 1.

According to the disclosure, a control for an electromagnetic holding brake and, preferably, for a spring-applied brake is proposed. In this context, the control is understood to refer particularly to the electrical circuit for the control. The holding brake has a coil for releasing and holding the holding brake or, more particularly, for releasing and holding a metallic armature of the holding brake, the coil requiring a minimum brake coil voltage for maintaining the brake in the released position, said voltage being influenced by and/or dependent on the coil, the armature, a spring applying pressure to the armature and pressing it away from the coil, the planned area of application of the holding brake, or generally the design of the holding brake. Such a minimum brake coil voltage, which ensures that the brake is reliably released even with predetermined impact or shock forces acting on the holding brake, is often specified directly by the brake manufacturer, or it can be determined through tests. Although the minimum brake coil voltage is sufficient to maintain the armature or the brake released or lifted, it is not sufficient to release the brake initially or, more particularly, from a braked state. A provision is made according to the disclosure that the control has a DC/DC converter with an input and an output. The DC/DC converter is designed to convert a variable input voltage applied to the input into a predetermined switch-on voltage provided at the output and a predetermined holding voltage provided at the output, which are preferably provided at the output so as to be temporally offset from one another or overlap. In this context, variable input voltage is understood particularly to mean that the voltage present at the input can be between a minimum value and a maximum value. In addition, the variable input voltage can also vary during operation. In order to ensure that the brake is reliably released, the holding voltage corresponds to the minimum brake coil voltage. In particular, the switch-on voltage is predetermined in order to ensure reliable release of the holding brake and can, for example, also be specified by the brake manufacturer or be dependent on the aforementioned factors that influence the holding brake's being maintained in the released position. It is essential for the invention that the DC/DC converter be designed to implement a 2-stage voltage control and, in a first stage, to maintain the switch-on voltage as a regulated DC voltage for a predetermined time, to downregulate the voltage from the switch-on voltage following a predetermined voltage curve to the holding voltage as regulated DC voltage, and to maintain it in a second stage.

The features according to the disclosure—i.e. the design of the DC-DC converter—result in the DC voltage being downregulated from the switch-on voltage to the holding voltage following the predetermined voltage curve and maintained at the holding voltage, which is lower than the switch-on voltage, as well as high or optimized electromagnetic compatibility (EMC) and high or optimized efficiency.

Furthermore, such a control according to the disclosure can also be designed to be optimized in terms of its electromagnetic compatibility (EMC) and in terms of its efficiency.

The DC-DC converter can be a switching regulator, for example, whose output voltage, which corresponds to the voltage provided at the output, is smoothed by a filter or at least one capacitor. In particular, when a combination of a switched-mode power supply and filter is used, the conversion results in low power loss. The voltage can therefore be clocked by the switching regulator, with a non-clocked voltage being applied to the brake coil due to the filter.

The variable input voltage is preferably equal to or higher than the switch-on voltage. Furthermore, the switch-on voltage is higher than the holding voltage. This enables a step-up converter to be avoided as a DC-DC converter.

In a simple variant, for example, the input voltage can correspond to the switch-on voltage, which can optionally also be smoothed. Accordingly, in the first step, the input voltage can be provided at the output as switch-on voltage for a predetermined time and then reduced to the holding voltage and maintained in the second step.

One advantageous development makes a provision that the DC/DC converter is designed to directly generate a non-clocked voltage and to provide it at the output as a switch-on voltage and as a holding voltage.

One advantageous variant makes a provision that the control has only one input and that the input voltage that is applied to the input provides a volt-age supply for the control and a control signal for the control.

In a first variant, the transition from the first step to the second step or from the switch-on voltage to the switch-off voltage can be sudden. Alternatively, one advantageous variant makes a provision that the DC/DC converter is designed to continuously regulate the switch-on voltage down to the holding voltage, for example following a linear profile.

In order to provide the customer with a universal interface, one advantageous development also makes a provision that the input of the control is a wide-range input, thus enabling the variable input voltage to be between a minimum value and a maximum value. Unlike the input voltage, however, the switch-on voltage and the holding voltage are each a fixed, predetermined value.

For example, the input voltage can be in a range between 24 V and 60 V.

Accordingly, the DC-DC converter is designed to convert an input voltage that lies between the minimum value and the maximum value into the fixed switch-on voltage and the fixed holding voltage, which can be ensured directly by the setup of the DC-DC converter or by detecting a level of the input voltage and a corresponding feedback control.

Another aspect of the invention relates to an electromagnetic holding brake with a control according to the invention.

Such a holding brake preferably has a coil, a spring, and an armature plate, the spring applying pressure to the armature plate and pressing it away from the coil.

In addition, one aspect of the invention relates to an engine or generally to a drive with an electromagnetic holding brake according to the invention. The engine has an engine control, the engine control with the control for controlling the holding brake being embodied as a common assembly—meaning, for example, in a housing or at least directly adjacent to one an-other. The control is designed in accordance with the control according to the invention and can implement further design variants of the control that are defined by the subclaims.

To reduce the installation space requirement and simplify assembly, a variant is also advantageous in which the engine control and the control for the electromagnetic holding brake are not only embodied in an assembly but instantiated on a common printed circuit board.

The engine can be an electric motor, for example, and preferably a brushless internal rotor engine.

In addition to the control, the holding brake, and the engine, one aspect of the invention also relates to a method for controlling an electromagnetic holding brake according to the invention or a control according to the invention. The input voltage is converted to the switch-on voltage by the DC-DC converter for a predetermined time and then reduced to the holding voltage following a predetermined profile. The method can also be used to control an electromagnetic holding brake with a control developed in accordance with the dependent claims.

The predetermined time can, for example, be a value that depends on the design of the holding brake. Alternatively, the reliable release of the brake can be detected by a sensor and, after the reliable release, the switch-on voltage can be reduced to the holding voltage.

The features disclosed above can be combined as required, provided this is technically possible and they do not contradict one another.

Other advantageous developments of the invention are identified in the subclaims.

The invention claimed is:

1. A control for an electromagnetic holding brake with a coil for releasing the holding brake and maintaining it in the released position, which requires a minimum brake coil voltage to maintain it in the released position, having a DC-DC converter with an input and an output, wherein the DC-DC converter is designed to convert a variable input voltage present at the input into a predetermined switch-on voltage provided at the output and a predetermined holding voltage provided at the output, wherein the holding voltage corresponds to the minimum brake coil voltage, and wherein the DC-DC converter is designed to implement a 2-stage voltage control and, in a first stage, to maintain the switch-on voltage as a regulated DC voltage for a predetermined time, to continuously downregulate the voltage from the switch-on voltage following a predetermined voltage curve to the holding voltage as regulated DC voltage, and to maintain the holding voltage in a second stage;
wherein the input of the control is wide-range input, thus enabling the variable input voltage to be between a minimum value and a maximum value; and
wherein the switch-on voltage and the holding voltage are each a fixed predetermined value, and wherein the predetermined voltage curve follows a linear profile.

2. The control as set forth in claim 1, wherein the variable input voltage is equal to or higher than the switch-on voltage, and the switch-on voltage is higher than the holding voltage.

3. The control as set forth in claim 1, wherein the DC/DC converter is designed to generate a regulated DC voltage directly and to provide it at the output as a switch-on voltage and as a holding voltage.

4. The control as set forth in claim 1, wherein the control has only one input, and the input voltage applied to the input provides a voltage supply for the control and a control signal for the control.

5. An electromagnetic holding brake with a control as set forth in claim 1.

6. The control as set forth in claim 1, wherein the DC-DC converter continuously downregulates the voltage over time from the switch-on voltage the holding voltage.

7. The control as set forth in claim 1, wherein the DC-DC converter is a switching regulator configured to smooth output voltage via a filter or at least one capacitor.

8. The control as set forth in claim 1, wherein the input voltage varies in a range between 24 V and 60 V.

9. An engine with an electromagnetic holding brake with a coil for releasing the holding brake and maintaining it in the released position, which requires a minimum brake coil voltage to maintain it in the re-leased position, and a control, wherein the control has a DC-DC converter with an input and an output, wherein the DC-DC converter is designed to convert a variable input voltage present at the input into a predetermined switch-on voltage provided at the output and a predetermined holding voltage provided at the output, wherein the holding voltage corresponds to the minimum brake coil voltage, wherein the DC-DC converter is designed to implement a 2-stage voltage control and, in a first stage, to maintain the switch-on voltage as a regulated DC voltage for a predetermined time, to continuously downregulate the voltage from the switch-on voltage following a predetermined voltage curve to the holding voltage as regulated DC voltage, wherein the predetermined voltage curve follows a linear profile, and to maintain the holding voltage in a second stage, and wherein the engine has an engine control and the engine control is embodied with the control as a common assembly.

10. The engine as set forth in claim 9, wherein the engine control and the control are instantiated on a common printed circuit board.

11. The engine as set forth in claim 9, wherein the DC-DC converter continuously downregulates the voltage over time from the switch-on voltage the holding voltage.

12. The engine as set forth in claim 9, wherein the DC-DC converter is a switching regulator configured to smooth output voltage via a filter or at least one capacitor.

13. A method for controlling an electromagnetic holding brake with a coil for releasing the holding brake and maintaining it in the released position, which requires a minimum brake coil voltage to maintain it in the released position, and a control, wherein the control has a DC-DC converter with an input and an output, wherein the DC-DC converter is designed to convert a variable input voltage present at the input into a predetermined switch-on voltage provided at the output and a predetermined holding voltage provided at the output, wherein the holding voltage corresponds to the minimum brake coil voltage, wherein the DC-DC converter is designed to implement a 2-stage voltage control and, in a first stage, to maintain the switch-on voltage as a regulated DC voltage for a predetermined time, to continuously downregulate the voltage from the switch-on voltage following a predetermined voltage curve to the holding voltage as regulated DC voltage, wherein the predetermined voltage curve follows a linear profile, and to maintain the holding voltage in a second stage, and wherein the input voltage is converted by the DC-DC-DC converter for a predetermined time into the switch-on voltage and is subsequently reduced to the holding voltage following a predetermined profile.

14. The method as set forth in claim 13, wherein the DC-DC converter continuously downregulates the voltage over time from the switch-on voltage the holding voltage.

15. The method as set forth in claim 13, wherein the DC-DC converter is a switching regulator configured to smooth output voltage via a filter or at least one capacitor.

16. A control for an electromagnetic holding brake with a coil for releasing the holding brake and maintaining it in the released position, which requires a minimum brake coil voltage to maintain it in the released position, having a DC-DC converter with an input and an output, wherein the DC-DC converter is designed to convert a variable input voltage present at the input into a predetermined switch-on voltage provided at the output and a predetermined holding voltage provided at the output, wherein the input voltage varies in a range between 24 V and 60 V, wherein the holding voltage corresponds to the minimum brake coil voltage, and wherein the DC-DC converter is designed to implement a 2-stage voltage control and, in a first stage, to maintain the switch-on voltage as a regulated DC voltage for a predetermined time, to continuously downregulate the voltage from the switch-on voltage following a predetermined voltage curve to the holding voltage as regulated DC voltage, and to maintain the holding voltage in a second stage;
   wherein the input of the control is wide-range input, thus enabling the variable input voltage to be between a minimum value and a maximum value; and
   wherein the switch-on voltage and the holding voltage are each a fixed predetermined value.

17. The control as set forth in claim 16, wherein the predetermined voltage curve follows a linear profile.

18. The control as set forth in claim 16, wherein the variable input voltage is equal to or higher than the switch-on voltage, and the switch-on voltage is higher than the holding voltage.

19. The control as set forth in claim 16, wherein the DC/DC converter is designed to generate a regulated DC voltage directly and to provide it at the output as a switch-on voltage and as a holding voltage.

20. The control as set forth in claim 16, wherein the control has only one input, and the input voltage applied to the input provides a voltage supply for the control and a control signal for the control.

21. The control as set forth in claim 16, wherein the DC-DC converter is a switching regulator configured to smooth output voltage via a filter or at least one capacitor.

* * * * *